(12) United States Patent
Helland

(10) Patent No.: US 11,681,705 B2
(45) Date of Patent: Jun. 20, 2023

(54) TRIE DATA STRUCTURE WITH SUBTRIE DATA STRUCTURES

(71) Applicant: salesforce.com, inc., San Francisco, CA (US)

(72) Inventor: Patrick James Helland, San Rafael, CA (US)

(73) Assignee: Salesforce, Inc., San Francisco, CA (US)

( * ) Notice: Subject to any disclaimer, the term of this patent is extended or adjusted under 35 U.S.C. 154(b) by 53 days.

(21) Appl. No.: 16/918,547

(22) Filed: Jul. 1, 2020

(65) Prior Publication Data
US 2022/0004554 A1  Jan. 6, 2022

(51) Int. Cl.
*G06F 16/2455* (2019.01)
*G06F 16/23* (2019.01)
*G06F 16/22* (2019.01)

(52) U.S. Cl.
CPC .... *G06F 16/24552* (2019.01); *G06F 16/2246* (2019.01); *G06F 16/2379* (2019.01)

(58) Field of Classification Search
CPC .......... G06F 16/24552; G06F 16/2379; G06F 16/2246; G06F 16/24561; G06F 16/24562
See application file for complete search history.

(56) References Cited

U.S. PATENT DOCUMENTS

| | | | |
|---|---|---|---|
| 5,355,478 A * | 10/1994 | Brady | G06F 7/24 |
| 6,560,610 B1 | 5/2003 | Eatherton et al. | |
| 6,711,562 B1 * | 3/2004 | Ross | G06F 16/2246 |
| | | | 707/999.2 |
| 6,772,179 B2 * | 8/2004 | Chen | G06F 12/0862 |
| 7,290,001 B2 | 10/2007 | Bennett et al. | |
| 10,230,639 B1 * | 3/2019 | Patil | H04L 45/48 |
| 2002/0194184 A1 * | 12/2002 | Baskins | G06F 16/9027 |
| 2013/0332484 A1 * | 12/2013 | Gajic | G06F 16/285 |
| | | | 707/E17.014 |

(Continued)

OTHER PUBLICATIONS

International Search Report and Written Opinion in PCT Appl. No. PCT/US2021/038037 dated Oct. 12, 2021, 14 pages.

(Continued)

*Primary Examiner* — Jensen Hu
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to tree data structures capable of storing information indicative of database keys. A computer system may operate a database. The computer system may store a multi-level tree data structure usable to perform key lookups for the database. In various cases, the multi-level tree data structure may be stored in system memory as a plurality of subtree data structures each comprising a set of linked nodes. A given one of the plurality of subtree data structures may be stored as a respective continuous block of information in system memory. The computer system may access the respective continuous block for a first particular subtree data structure encompassing a particular range of levels in the multi-level tree data structure. The accessing may be performed without accessing one or more other subtree data structures encompassing one or more levels within the particular range of levels.

15 Claims, 7 Drawing Sheets

(56) References Cited

U.S. PATENT DOCUMENTS

| | | | | |
|---|---|---|---|---|
| 2014/0188870 A1* | 7/2014 | Borthakur | ............... | G06F 16/22 |
| | | | | 707/736 |
| 2016/0103858 A1 | 4/2016 | Katz et al. | | |
| 2017/0139594 A1* | 5/2017 | Ahn | .................... | G06F 12/0246 |
| 2017/0212680 A1* | 7/2017 | Waghulde | ............. | G06F 3/0644 |
| 2019/0236156 A1* | 8/2019 | Fanghaenel | ........... | G06F 16/172 |
| 2020/0183906 A1* | 6/2020 | Spillane | .................. | G06F 16/86 |
| 2020/0201821 A1* | 6/2020 | Wang | ...................... | G06F 16/13 |
| 2020/0341889 A1* | 10/2020 | Idreos | ................. | G06F 16/2272 |

OTHER PUBLICATIONS

Li et al., "Tree indexing on solid state drives," Proceedings of the VLDB Endowment; Assoc. of Computing Machinery, vol. 3, No. 1-2, Sep. 1, 2010, pp. 1195-1206.

Acharya et al., "Adaptive Algorithms for Cache-efficient Trie Search," Jan. 1, 1999, pp. 1-11, XP055846887, retrieved from URL: Httos:// www.cs.rochester.edu/u/kshen/papers/trie.pdf.

* cited by examiner

TRIE DATA STRUCTURE WITH SUBTRIE DATA STRUCTURES

BACKGROUND

Technical Field

This disclosure relates generally to database systems and, more specifically, to tree data structures that can store information indicative of database keys.

Description of the Related Art

Modern database systems routinely implement management systems that enable users to store a collection of information in an organized manner that can be efficiently accessed and manipulated. In some cases, these management systems maintain a log-structured merge-tree (LSM tree) having multiple levels that each store information in database records as key-value pairs. An LSM tree normally includes two high-level components: an in-memory buffer and a persistent storage. In operation, a database system initially writes database records into the in-memory buffer before later flushing them to the persistent storage. As part of flushing database records, the database system writes the database records to new files stored on the persistent storage.

Figure 1:
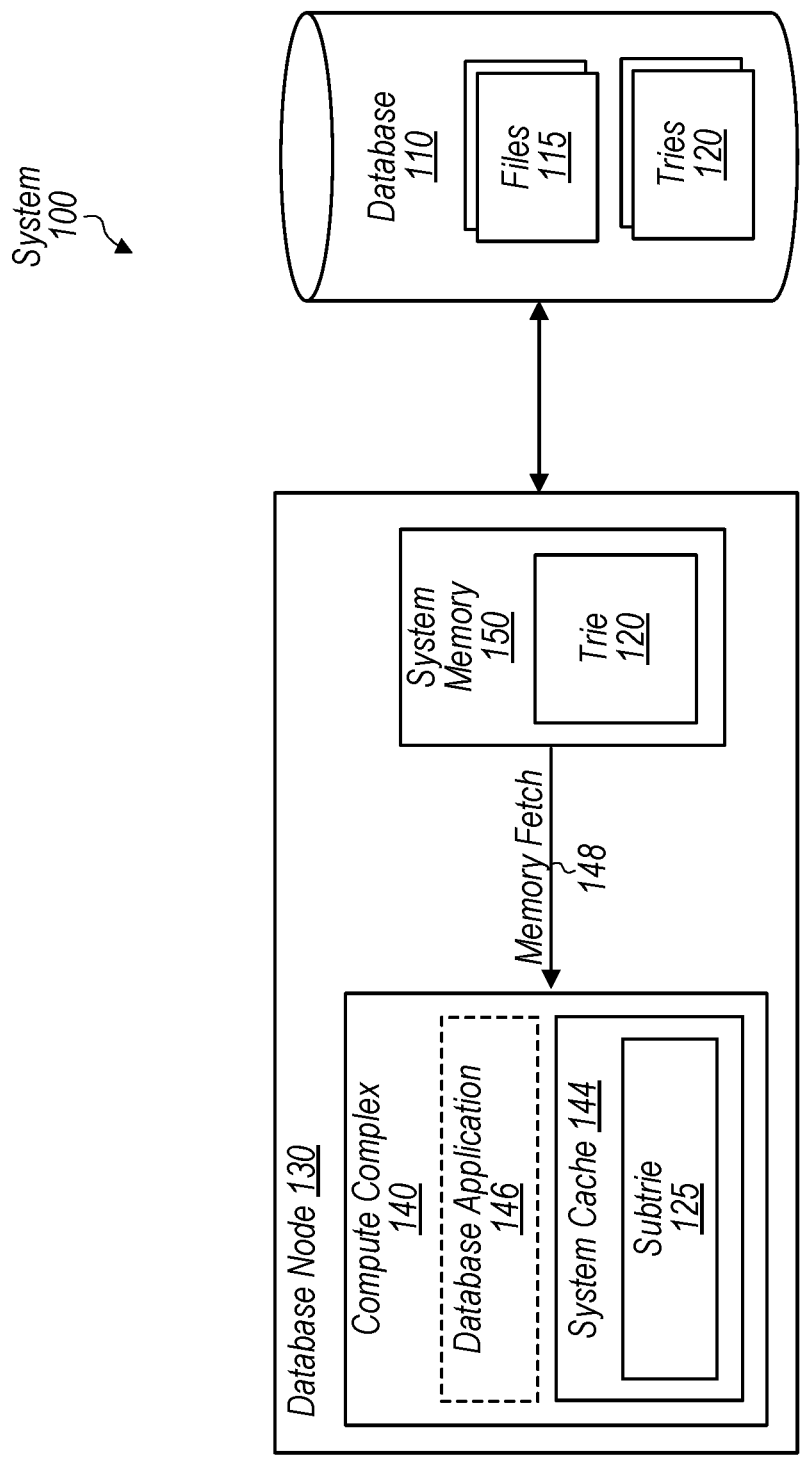
FIG. 1 is a block diagram illustrating example elements of a system capable of using a set of trie data structures, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to both a software and a hardware module.

DETAILED DESCRIPTION

During the operation of a database built around an LSM tree, a database system usually flushes database records from an in-memory buffer to files stored on a persistent storage. A file often includes multiple database records that correspond to a variety of different database key values. In operation, the database system processes transaction requests that can involve accessing databases records from files of the persistent storage for database keys specified in those transaction requests. As part of processing a transaction request, in some cases, the database system performs a single-database-record lookup in which the database system retrieves files from the persistent storage and checks them for a database record corresponding to a specific database key that is identified in the transaction request. But in many cases, files retrieved by the database system do not contain a database record that corresponds to the specific database key. As a result, the database system wastes time and resources fetching those files from the persistent storage.

In some cases, probabilistic data structures, such as Bloom filters, can be used to reduce the number of files fetched from the persistent storage as they often provide, for a database key, an indication that a corresponding database record may exist in a file or certainly does not exist in that file. Accordingly, the database system can fetch only those files in which a corresponding database record may exist and skip those files in which the corresponding database record does not exist. But in some cases, as part of processing a transaction request, the database system performs a key range lookup in which the database system searches for database records whose database keys fall within a specified key range. A particular type of probabilistic data structure, referred to as a "trie" (alternatively, a "trie data structure"), can be used in a key range lookup in order to reduce the number of files fetched from the persistent storage. Tries can also be used to determine if a particular database node includes, in its in-memory buffer, database records whose database keys fall within a specified key range. As used herein, the term "trie" is used in accordance with its established meaning and refers to a tree-like data structure whose branches are made of linked nodes that correspond to character values. Accordingly, a branch of a trie can represent a database key where the individual nodes of that branch correspond to the individual characters of the database key.

While tries provide advantages over other probabilistic data structures, such as Bloom filters, in relation to key range lookups, there are disadvantages to the current implementations of tries. One disadvantage pertains to the way in which tries are stored in system memory and then fetched from the system memory into a system cache. These implementations currently result in a relatively high number of memory fetches when traversing a branch of a trie. In particular, current implementations store tries in system memory such that all the nodes of a given level precede in memory all the nodes of the next level in the trie. As a result, traversing from one level down to the next level as part of a branch traversal can involve moving a reasonable memory distance in system memory. Consider an example in which a computer system traverses from the $27^{th}$ level to the $28^{th}$ level of a certain trie. Due to the $27^{th}$ level likely including a large number of nodes and the limited size of caches, when the computer system issues a memory request to fetch data for the $27^{th}$ level from the system memory into a cache, the data that is returned from the system memory is highly unlikely to include data for nodes of the $28^{th}$ level. That is, the chunk of sequential data fetched from the system memory to store in the system cache is likely to include only data that represents a portion of the nodes of the $27^{th}$ level and no data that represents the nodes of the $28^{th}$ level. As a result, when traversing down from the $27^{th}$ level to $28^{th}$ level of the trie, the computer system will have to issue another memory request to fetch data for the $28^{th}$ level. The above manner of storing a trie in system memory results in the system having to issue one memory request per node of the branch that is being descended. Consequently, descending a branch (which often is multiple levels of the data structure) involves a high number of memory requests that together can take an exorbitant amount of time to process.

The present disclosure describes techniques for implementing a trie data structure that overcomes some or all of the disadvantages of other trie approaches. In various embodiments described below, a computer system maintains trie data structures that respectively comprise a set of subtrie data structures, each having a set of linked nodes. In various cases, a first subtrie data structure may be connected to a second subtrie data structure as part of a particular branch of the trie data structure. In various embodiments, the first subtrie data structure is stored, in system memory, as a continuous block of information that includes node information detailing nodes of the first subtrie data structure and pointer information that identifies a location in the system memory where information of the second subtrie data structure is stored. The computer system can load the second subtrie data structure into a system cache of the computer system using the pointer information included in the first subtrie data structure. In various cases, the second subtrie data structure and other subtrie data structures may encompass nodes within the same particular range of levels in the trie data structure. In various embodiments, the computer system loads the second subtrie data structure without accessing one or more other subtrie data structures encompassing nodes within one or more levels of the same particular range of levels as the second subtrie data structure.

Consider the previous example in which the computer system traverses down through the $27^{th}$ and $28^{th}$ levels of a particular branch. The trie data structure implemented by the techniques discussed by the present disclosure may include a first subtrie data structure that includes nodes of the $26^{th}$ level (one of which may correspond to the particular branch) and a second subtrie data structure that includes nodes of the particular branch from the $27^{th}$ level to the $34^{th}$ level, for example. The second subtrie data structure can be stored entirely in a system cache, while including nodes from the $27^{th}$ level to the $34^{th}$ level because the second subtrie data structure does not have to include all the nodes in those levels. As a result, when the computer system fetches the second subtrie data structure into a system cache using pointer information included in the first subtrie data structure, the computer system can traverse from the $27^{th}$ level to the $34^{th}$ level of the particular branch without having to issue another memory request. As such, these techniques may be advantageous over prior approaches as these techniques allow for the computer system to issue fewer memory requests when traversing a branch of a trie data structure. That is, the prior approach wastes cache space fetching most or all of the nodes of a particular level when many of those nodes are not relevant to the traversal of a particular branch of the trie. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database 110 and a database node 130 that includes a compute complex 140 and system memory 150. As further shown, database 110 includes files 115 and tries 120, and compute complex 140 executes a set of program instructions to implement a database application 146 and includes a system cache 144. In some embodiments, system 100 is implemented differently than shown. For example, system 100 may include multiple database nodes 130 that interact with each other and database 110.

System 100, in various embodiments, implements a platform service (e.g., a customer relationship management (CRM) platform service) that allows users of that service to develop, run, and manage applications. System 100 may be a multi-tenant system that provides various functionality to multiple users/tenants hosted by the multi-tenant system. Accordingly, system 100 may execute software routines from various, different users (e.g., providers and tenants of system 100) as well as provide code, web pages, and other data to users, databases, and other entities associated with system 100. As shown for example, system 100 includes database node 130 that can store and access data from files 115 of database 110 on behalf of users associated with system 100.

Database 110, in various embodiments, is a collection of information that is organized in a manner that allows for access, storage, and manipulation of that information. Accordingly, database 110 may include supporting software that allows for database node 130 to carry out operations (e.g., accessing, storing, etc.) on information that is stored at database 110. In some embodiments, database 110 is implemented by a single or multiple storage devices connected together on a network (e.g., a storage attached network (SAN)) and configured to redundantly store information to prevent data loss. The storage devices may store data persistently and thus database 110 may serve as a persistent storage. In various embodiments, database 110 is shared between multiple database nodes 130 such that database records written into files 115 by one database node 130 are accessible by other database nodes 130.

In various embodiments, database 110 implements a part of a log-structured merge-tree (LSM tree) having multiple levels of files 115 that include database records. An LSM tree may comprise two high-level portions: an in-memory portion and an on-disk portion. One or more "top" levels of the LSM tree may comprise database records that are written to an in-memory buffer of database node 130. The remaining levels of the LSM tree may comprise files 115 that include database records that are written to database 110. In various cases, system memory 150 and system cache 144 may facilitate the in-memory portion of an LSM tree while database 110 facilitates the on-disk portion of the LSM tree.

Files 115, in various embodiments, are sets of database records. A database record may be a key-value pair comprising data and a corresponding database key that is usable to look up that database record. For example, a database record may correspond to a data row in a database table where the database record specifies values for one or more attributes associated with the database table. In various embodiments, a file 115 is associated with one or more database key ranges defined by the keys of the database records that are included in that file 115. Consider an example in which a file 115 stores three database records associated with keys "AA," "AB," and "AC," respectively. Those three keys span a database key range of AA→AC and thus that file 115 may be associated with a database key range of AA→AC. As discussed herein, a trie 120 may be used by database node 130 to determine whether a file 115 has database records associated with database keys that fall within a specified database key range.

Figure 2:
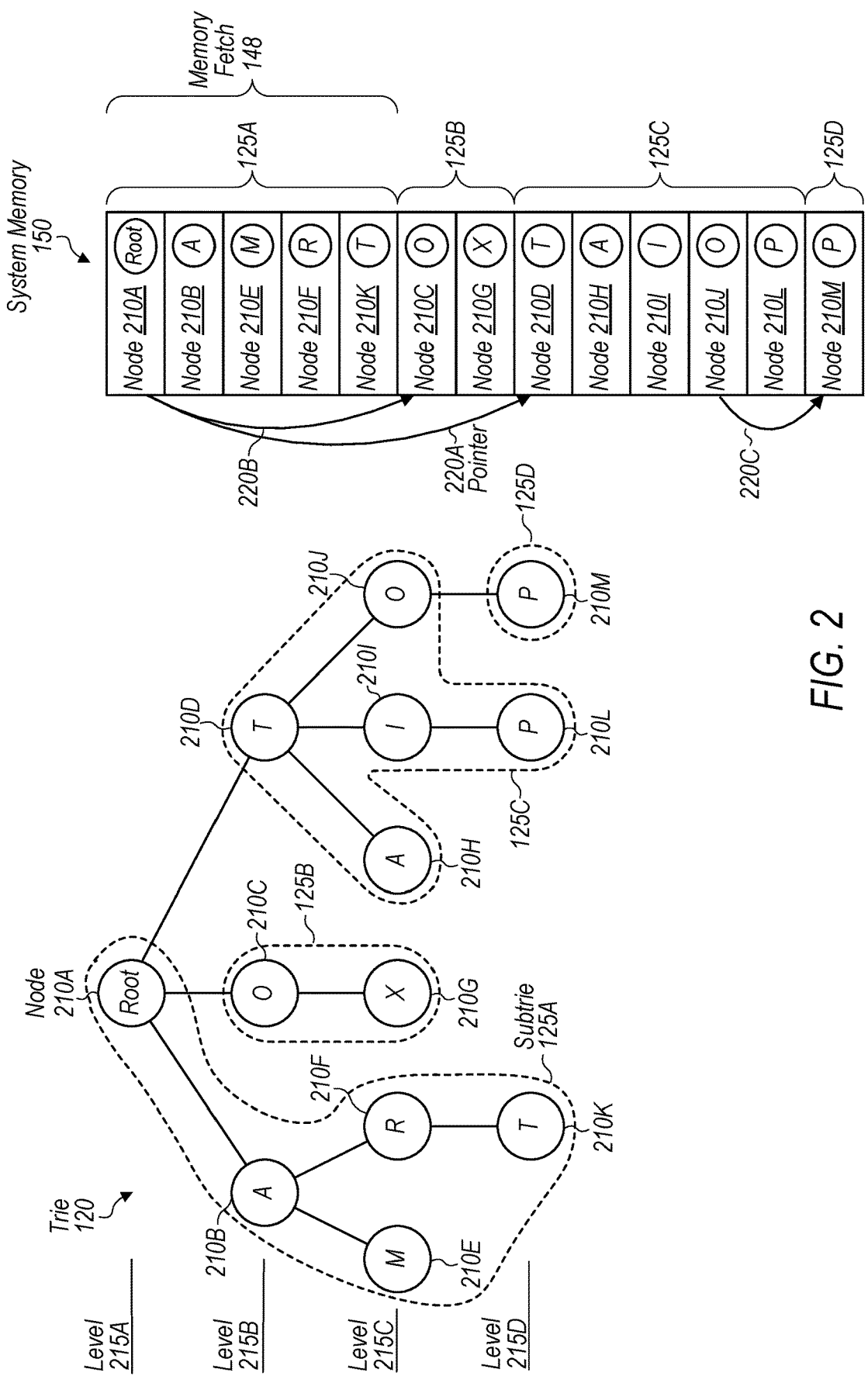
FIG. 2 is a block diagram illustrating example elements of a trie data structure having a set of subtrie data structures, according to some embodiments.

Tries 120, in various embodiments, are trie data structures that comprise a set of subtrie data structures each including a set of linked nodes. An example of a trie 120 is shown in FIG. 2. A trie 120 may be a probabilistic data structure that can provide an indication of the database key ranges associated with one or more files 115. As used herein, the term "probabilistic data structure" refers to a data structure that maintains information indicating that a particular item either does not exist or might exist at a particular location within a system. As an example, a probabilistic data structure can store information that indicates that a database record does not exist or might exist within a file. In various embodiments, a trie 120 has a reasonably smaller memory footprint than the corresponding file 115. Consequently, database node 130 may more quickly and efficiently access tries 120 than accessing the corresponding files 115. As a result, using a trie 120 to check for whether a certain database record may be included in a given file 115 instead of directly accessing the given file 115 to check for the database record can provide a substantial performance boost to system 100.

When database records are written out to a file 115, in various embodiments, database node 130 generates a trie 120 for that file 115. The trie 120 may form a tree-like data structure whose branches correspond to the database keys of those database records being written to the corresponding file 115. Accordingly, a branch may comprise nodes that represent the character values of a corresponding database key. When database node 130 wishes to determine whether a file 115 might include a certain database record, in various embodiments, database node 130 can perform a single key lookup that includes searching the corresponding trie 120 for a branch whose nodes match the character values of the database key of that database record. Database node 130 may also perform a key range lookup that includes searching the corresponding trie 120 for any branch whose collective nodes fall within a specified key range. If such a branch can be found in the trie 120, then database node 130 may determine that at least one database record might exist in the corresponding file 115 that falls within the specified key range.

In various embodiments, system 100 is implemented with multiple database nodes 130 that initially write database records to their own in-memory buffer before flushing the database records to database 110. During operation, a database node 130 may desire to access the latest version of a data row as part of processing a database transaction. That latest version, however, may be stored in the in-memory buffer of another database node 130. Consequently, the former database node 130 may issue a database record request to the latter database node 130 in order to determine whether the latest version is stored at the latter database node 130. In many cases, it is not stored at the latter database node 130 and resources are wasted. Accordingly, in various embodiments, tries 120 can also be used to determine whether a database record might exist in the in-memory buffer of another database node 130 and thus whether a database record request should be issued.

Database node 130, in various embodiments, is hardware, software, or a combination thereof capable of providing database services, such as data storage, data retrieval, and/or data manipulation. Such database services may be provided to other components within system 100 and/or to components external to system 100. As an example, database node 130 may receive a database transaction request from an application server (not shown) that is requesting data to be written to or read from database 110. The database transaction request may specify an SQL SELECT command to select one or more rows from one or more database tables. The contents of a row may be defined in a database record and thus database node 130 may locate and return one or more database records that correspond to the selected one or more table rows. In some cases, the database transaction request may instruct database node 130 to write one or more database records for the LSM tree. Database node 130, in various embodiments, initially writes database records to system cache 144 and system memory 150 before flushing those database records to database 110.

Compute complex 140, in various embodiments, is a collection of processors, processor cores, and/or caches 144. As an example, compute complex 140 may include 4 processor cores that have their own internal system caches 144. Processor cores of compute complex 140 may be configured to execute instructions of a particular instruction set architecture (ISA), which may include operating system instructions and user application instructions (e.g., instructions that are executable to implement database application 146). These instructions may be stored in a non-transitory computer readable medium, such as system memory 150 that is coupled to compute complex 140. System memory 150 may be a volatile memory (e.g., dynamic random access memory) or a non-volatile memory (e.g., NAND flash memory). Compute complex 140 may retrieve a set of program instructions from system memory 150 and execute the program instructions to perform functionality described herein, such as database application 146.

Database application 146, in various embodiments, is a set of program instructions that are executable to manage database 110, including managing an LSM tree built around database 110. Accordingly, database application 146 may process database transactions to read records from and write records to the LSM tree. Database application 146 may maintain metadata that describes the structural layout of the LSM tree, including where files 115 are stored at database 110 and what records may be included in those files 115. In various embodiments, the metadata includes tries 120 that correspond to the files 115 stored at database 110. Database application 146 may use the metadata to perform quicker and more efficient key range lookups as part of processing database transactions, as discussed.

To facilitate the processing of database transactions, in various embodiments, database node 130 uses tries 120. For example, as discussed, database node 130 may use tries 120, when searching for database records that fall within a database key range, to identify files 115 and/or database nodes 130 that might include such database records. Accordingly, database node 130 may initially retrieve one or more of tries 120 from database 110 and then store them in system memory 150. In some embodiments, when database node 130 wishes to check a particular file 115 and/or other database node 130, database node 130 retrieves, at that point, a corresponding trie 120 and stores it in system memory 150. Once a trie 120 has been stored in system memory 150, database node 130 may begin to perform a traversal of that trie 120.

When traversing a trie 120, database node 130 may issue a memory fetch 148 to system memory 150 to load, into system cache 144, a subtrie 125 of the trie 120 that includes the root node of the entire trie 120. As mentioned, a trie 120 comprises a set of subtries 125. A subtrie 125, in various embodiments, is a tree-like data structure having one or more branches that are made of linked nodes corresponding to character values. For example, one branch of a subtrie 125 may correspond to a portion or all of a particular database key—the remaining portions of that database key may correspond to branches of other subtries 125 that are linked to the former subtrie 125. When stored in system cache 144 and system memory 150, a subtrie 125 may be stored as one continuous block of information/data (bytes) in the memory address space. A trie 120, however, may not be stored as one continuous block of information, in some cases—that is, the individual subtries 125 may not be contiguous with one another in memory. But in some cases, a trie 120 may be stored as one continuous block of information in memory. In various embodiments, the memory size of a subtrie 125 does not exceed the memory space of system cache 144. Accordingly, database node 130 may load an entire subtrie 125 into system cache 144. A trie 120, however, may be larger than the memory space of system cache 144 and thus cannot be loaded entirely by database node 130 into system cache 144. An example of a subtrie 125 is discussed with respect to FIG. 2.

After a subtrie 125 has been loaded into system cache 144, database node 130 may then begin to traverse the branches of that subtrie 125 to determine if those branches correspond to database keys that fall within a particular database key range. When traversing a given branch of a first subtrie 125, in various cases, database node 130 may reach a node in the branch that is linked to another node included in a second subtrie 125. Database node 130 may load, into system cache 144, the second subtrie 125 using pointer information, included in the first subtrie 125, that identifies a memory location where the second subtrie 125 is stored in system memory 150. Database node 130 may then continue traversing the branch via the second subtrie 125 stored in system cache 144. In this manner, database node 130 may traverse a branch that can extends across multiple subtries 125. When database node 130 accesses a subtrie 125 that spans a range of levels, in various embodiments, database node 130 accesses a subset of all the nodes within those levels, the other nodes being encompassed in other subtries 125 that span that range of levels. By not having to access all the nodes within a level as part of traversing a particular branch, database node 130 may use the memory space, which would be occupied by nodes that are not relevant to the particular branch, to access more nodes in lower levels of the trie 120 that are relevant to the traversal of that particular branch.

Turning now to FIG. 2, a block diagram of example elements of a trie 120 and its layout within system memory 150 is shown. In the illustrated embodiment, trie 120 includes subtries 125A-D, each having a set of nodes 210. As shown, subtrie 125A includes nodes 210A, 210B, 210E, 210F, and 210K; subtrie 125B includes nodes 210C and 210G; subtrie 125C includes nodes 210D, 210H, 210I, 210J, and 210L; and subtrie 125D includes node 210M. As further shown, information that is representative of subtries 125A-125D is stored contiguously within system memory 150. In some embodiments, trie 120 and/or its layout within system memory 150 may be implemented differently than shown. As an example, trie 120 may be stored non-contiguously in system memory 150.

As mentioned, in various embodiments, a trie 120 is used to store the database keys of the database records that have been written into the file 115 corresponding to the trie 120. As shown, the trie 120 of the illustrated embodiment stores at least the keys "AM," "ART," "OX," "TA," "TIP," and "TOP." Each database key may be stored in trie 120 as a set of linked nodes 210 that form a branch of trie 120. For example, the key "TIP" is stored as nodes 210D, 210I, and 210L that form a branch descending levels 215A-D of trie 120. As discussed in more detail in respect to FIG. 3, a node 210, in various embodiments, is a data structure storing information about the character value that it represents and the manner in which the node 210 is linked with other nodes 210.

When performing a key range lookup (or a single key lookup), database node 130 may traverse the levels 215 of trie 120 by issuing memory fetches 148 to load subtries 125 from system memory 150 into system cache 144. Consider an example in which database node 130 wishes to determine whether a file 115 corresponding to trie 120 is likely to include a database record that falls within the key range "TCP"→"TLC." In various embodiments, database node 130 first issues a memory fetch 148 to system memory 150 to load the subtrie 125 that includes the node 210 representing the root of trie 120. In the illustrated embodiment, node 210A stores the root character value and thus subtrie 125A is fetched into system cache 144. As shown, five nodes 210 are fetched—this may be because system cache 144 may have capacity for storing information of only five nodes 210 at a time.

Once subtrie 125A is loaded into system cache 144, database node 130 may determine that node 210A is linked to three nodes: node 210B, 210C, and 210D. Database node 130 may further determine that nodes 210B and 210C represent character values that are outside of the key range "TCP"→"TLC" while nodes 210D's character value "T" falls within the range. As such, database node 130 may traverse the branch that includes node 210D. Since subtrie 125A does not include node 210D, database node 130 may issue another memory fetch 148 to load subtrie 125C into system cache. Because node 210A is linked to nodes 210 that are stored as part of other subtries 125, in various embodiments, node 210A includes pointers 220A and 220B that indicate memory locations in system memory 150 where the other subtries 125 are stored. Accordingly, using pointer 220A, database node 130 may load subtrie 125C into system cache 144 without having to load other subtries 125.

Once subtrie 125C is loaded into system cache 144, database node 130 may traverse the branches and determine that linked nodes 210D, 210I, and 210L form a key that falls within the key range "TCP"→"TLC" and thus the corresponding file 115 may store a database record that falls within that key range. In various cases, database node 130 may perform a key lookup in which multiple levels 215 are descended, but not all nodes 210 are accessed for those levels 215 that were descended. In the previous example, database node 130 did not fetch, into system cache 144, information for nodes 210C, 210G, and 215M. By not accessing all the nodes 210 of the levels 215 that are descended in a key lookup, database node 130 may reduce the number of memory fetches 148 that are issued, saving time and resource consumption.

Figure 3:
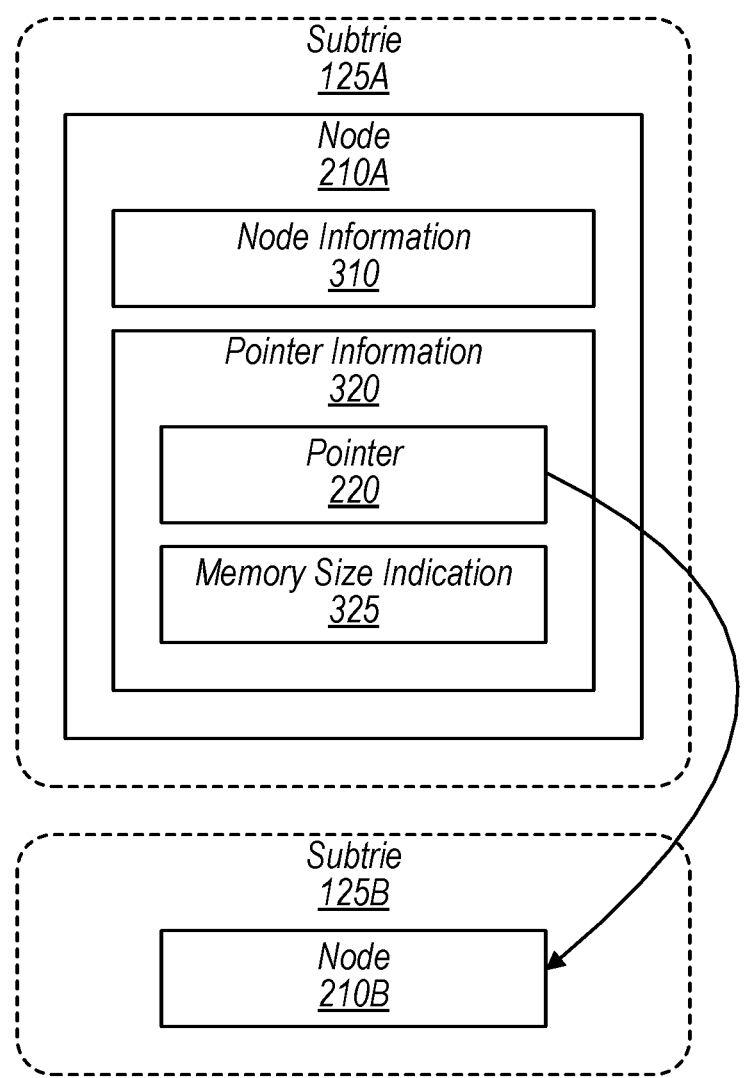
FIG. 3 is a block diagram illustrating example elements of pointer information of a node of a trie data structure, according to some embodiments.

Turning now to FIG. 3, a block diagram of example elements of a node 210 included in a subtrie 125 within a trie 120 is shown. In the illustrated embodiment, a subtrie 125A includes a node 210A and a subtrie 125B includes a node 210B. As shown, node 210A includes node information 310 and pointer information 320 that indicates a location of node 210B. As further shown, pointer information 320 includes a pointer 220 and a memory size indication 325. In some embodiments, a node 210 is implemented differently than shown. As an example, pointer information 320 may not include memory size indication 325.

Node information 310, in various embodiments, includes information indicative of the character value represented by the corresponding node 210. Node information 310 may further indicate nodes 210 that are connected to the node 210 of node information 310. For example, node information 310 of node 210A may indicate that node 210A is linked to node 210C and that node 210C follows node 210A in order. As another example, node information 310 of node 210A may indicate that node 210A descended from another particular node 210. In some embodiments, node information 310 indicates in which level of a trie 120 that the node 210 of node information 310 exists. For example, node information 310 may indicate that node 210A is in the second level down from the top of a trie 120.

Pointer information 320, in various embodiments, includes information that can be used to access one or more nodes 210 that are linked to the node 210 of pointer information 320. In various cases, pointer information 320 may include a pointer (e.g., a memory offset) to a node 210 that exists in the same subtrie 125 as the node 210 of pointer information 320. For example, node 210A and a node 210B (not depicted) may be directly linked and included in a particular subtrie 125. Pointer information 320 of node 210A may indicate a location in the data structure of the particular subtrie 125 from which node 210B can be accessed. In various cases, pointer information may include a pointer (e.g., a memory offset) to a node 210 that exists in a different subtrie 125 as the node 210 of pointer information 320. As shown, pointer information 320 of node 210A includes a pointer 220 that identifies a location (e.g., a memory address in system memory 150) of node 210C—that is, pointer 220 may identify the location in system memory 150 that includes the block of information/data (e.g., bytes defining node information 310 and pointer information 320) describing the pointed-to node 210.

Accordingly, when traversing a branch from node 210A to node 210C, database node 130 may use pointer information 320 of node 210A to load subtrie 125B (which includes node 210C) into system cache 144 from system memory 150. In various embodiments, pointer information 320 includes a memory size indication 325 that indicates a size (e.g., 64 KBs) of the subtrie 125 that includes the pointed-to node 210. Accordingly, when attempting to lead subtrie 125B into system cache 144, database node 130 may determine, based on the size of subtrie 125B that is indicated by memory size indication 325 of pointer information 320 of node 210A, how much data to request from system memory 150 to load subtrie 125B. As an example, memory size indication 325 may specify a number of cache lines that a subtrie 125 consumes when stored in system cache 144. Accordingly, database node 130 may fetch that that number of cache lines worth of data from system memory 150. By using memory size indication 325, database node 130 may not fetch more data from system memory 150 than is needed to load a subtrie 125.

Figure 4:
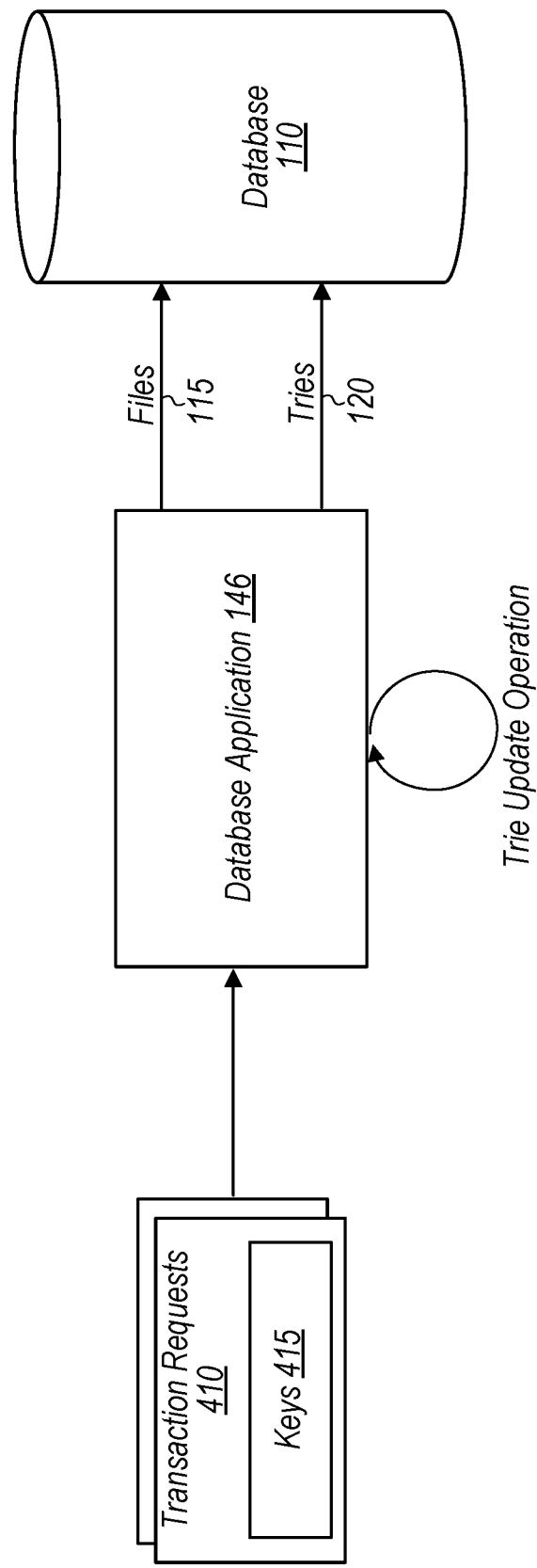
FIG. 4 is a block diagram illustrating example elements of creating and updating tries by a database application, according to some embodiments.

Turning now to FIG. 4, a block diagram of a database application 146 writing files 115 and tries 120 to a database 110 is shown. As further shown, database application 146 receives a set of transaction requests 410 having keys 415. A transaction request 410 may specify a set of database records (along with their corresponding keys 415) to be written to database 110 as files 115. Accordingly, database application 146 may process a transaction request 410 to write one or more files 115 to database 110. As part of processing a transaction request 410, database application 146 may generate, for one or more files 115, a corresponding trie 120 that includes the keys 415 of the database records included in those one or more files 115. In yet some cases, as part of processing a transaction request 410, database application 146 may generate a set of tries 120 based on keys 415 of database records that are stored at an in-memory buffer (which may be implemented using system cache 144 and system memory 150) of database node 130.

When generating a trie 120, database application 146 may insert keys 415 into the trie 120 as branches of the trie's tree-like structure. In various cases, keys 415 may share a common prefix and as a result, share a common part of a branch. For example, as shown in FIG. 2, keys "AM" and "ART" share a common node 210 (i.e., node 210B) in their respective branches. As part of generating a trie 120, in various embodiments, database application 146 determines a division of the nodes 210 of that trie 120 into subtries 125. Database application 146 may use various criteria for determining how to division the nodes 210. One such criteria may include ensuring proximity to a ratio between the number of nodes 210 in a subtrie 125 and the number of levels 215 in the subtrie 125. For example, database application 146 may sure that for every four nodes, the subtrie 125 descends at least one additional level. Accordingly, if a subtrie 125 includes nine nodes 210 in this example, then the subtrie 125 includes three levels 215. Another criteria may include ensuring proximity to a ratio between the number of nodes 210 in a trie 120 and the number of subtries 125. For example, if there are fifty nodes 210 in a trie 120, then database application 146 may divide those nodes 210 into five subtries 125 such that there are ten nodes 210 per subtrie 125. Another criteria may include ensuring that the average number of memory fetches 148 needed to access an entire given branch of a trie 120 is minimized. After determining a division of the nodes 210, in various embodiments, database application 146 structures each group of nodes 210 as a respective continuous block of data.

In some cases, database application 146 may update a trie 120. For example, if a certain trie 120 is being used to determine whether a record is stored at another database node 130 for a specified key 415 and the nature of what records are stored at the other database node 130 is changing overtime, then that trie 120 may be updated to reflect the changes. That is, if another database node 130 updates its in-memory buffer to include a new database record, then a trie 120 that is used by database application 146 may be updated to incorporate the key 415 of that database record. In various cases, when updating a trie 120, database application 146 adds one or more nodes 210 to the trie 120. When adding one or more nodes 210, database application 146 may modify a particular subtrie 125 to encompass the added one or more nodes 210. This may cause the particular subtrie 125 to span one or more additional levels 215. In some cases, database application 146 may create a new subtrie 125 to include the one or more added nodes 210. In yet some cases, database application 146 may split a particular subtrie 125 into multiple subtries 125 where one of the subtries 125 encompasses the added one or more nodes 210.

Figure 5:
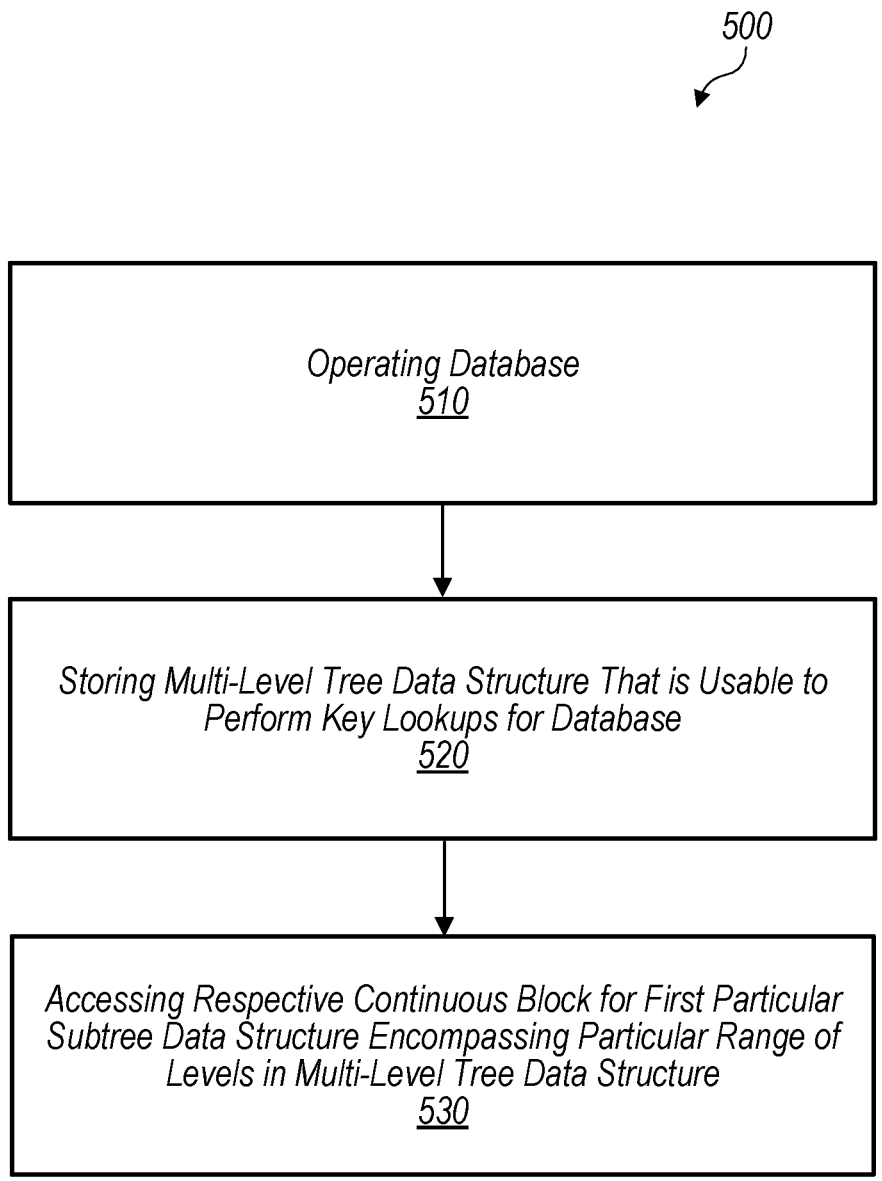
FIGS. 5-6 are flow diagrams illustrating example methods relating to using trie data structures, according to some embodiments.

Turning now to FIG. 5, a flow diagram of a method 500 is shown. Method 500 is one embodiment of a method performed by a computer system (e.g., database node 130) in order to facilitate the processing of transaction requests (e.g., transaction requests 410). Method 500 may be performed by executing one or more program instructions stored on a non-transitory computer-readable medium. In some embodiments, method 500 may include more or less steps than illustrated—e.g., method 500 may include a step in which the computer system receives a transaction request.

Method 500 begins in step 510 with the computer system operating a database (e.g., a database 110). In various embodiments, operating the database includes the computer system receiving a transaction request to perform a transaction that includes writing, to the database, a file (e.g., a file 115) that includes a set of records associated with a set of keys (e.g., a set of keys 415). The computer system may perform the transaction, which can include generating a multi-level tree data structure (e.g., a trie 120) such that nodes (e.g., nodes 210) included in multi-level tree data structure correspond to characters of the set of keys. The multi-level tree data structure may be associated with the file.

In step 520, the computer system stores a multi-level tree data structure that is usable to perform key lookups for the database. In various cases, the multi-level tree data structure may be stored in system memory (e.g., a system memory 150) as a plurality of subtree data structures (e.g., subtries 125) each comprising a set of linked nodes. A given one of the plurality of subtree data structures may be stored as a respective continuous block of information in system memory. A memory size of the respective continuous block for the given subtree data structure may not exceed a memory size of a system cache (e.g., a system cache 144) coupled to the system memory. The multi-level tree data structure may be stored as a continuous block of information in the system memory.

In step 530, the computer system accesses the respective continuous block for a first particular subtree data structure (e.g., subtrie 125A) encompassing a particular range of levels (e.g., levels 215A-D) in the multi-level tree data structure. In various cases, the accessing may be performed without accessing one or more other subtree data structures (e.g., subtries 125B and 125C) encompassing one or more levels within the particular range of levels. The computer system may update the multi-level tree data structure to include one or more nodes. As part of updating the structure, the computer system may modify a particular one of the plurality of subtree data structures such that a particular range of levels encompassed by the particular subtree data structure is changed (e.g., the subtree data structure is expanded to encompass an newly added node in a different level). In some cases, the updating may include splitting one of the plurality of subtree data structures into two or more subtree data structures.

In some cases, the set of linked nodes of the first particular subtree data structure may correspond to characters of keys inserted into the multi-level tree data structure. A particular key may correspond to at least one node in the first particular subtree data structure and at least one node in a second particular subtree data structure. The respective continuous block for the first particular subtree data structure may include pointer information (e.g., pointer information 320) that identifies a location in the system memory where the respective continuous block for the second particular subtree data structure is stored. As such, the computer system may fetch the respective continuous block for the second particular subtree data structure into a system cache from the system memory using the pointer information that is included in the respective continuous block for the first particular subtree data structure. The pointer information may identify a memory size of the respective continuous block for the second particular subtree data structure. The memory size may indicate a number of cache lines that the respective continuous block for the second particular subtree data structure consumes when stored in a system cache coupled to the system memory.

Figure 6:
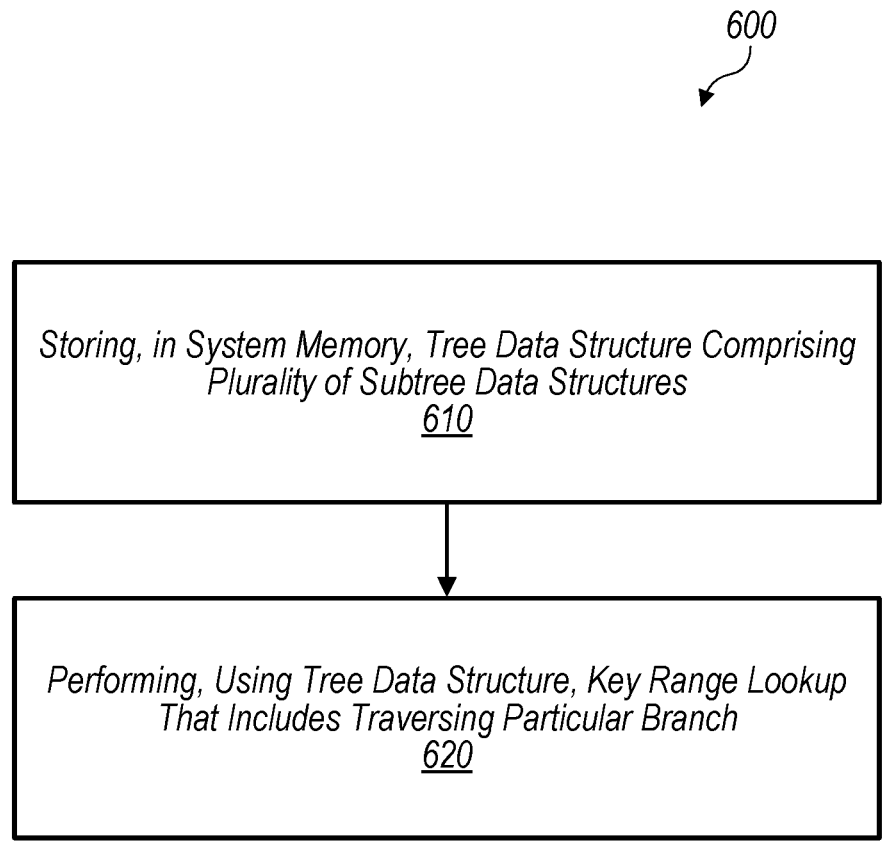

Turning now to FIG. 6, a flow diagram of a method 600 is shown. Method 600 is one embodiment of a method performed by a computer system (e.g., database node 130) in order to facilitate the processing of transaction requests (e.g., transaction requests 410). Method 600 may be performed by executing one or more program instructions stored on a non-transitory computer-readable medium. In some embodiments, method 600 may include more or less steps than illustrated—e.g., method 600 may include a step in which the computer system receives a transaction request.

Method 600 begins in step 610 with the computer system storing, in system memory (e.g., system memory 150), a tree data structure (e.g., a trie 120) comprising a plurality of subtree data structures (e.g., subtries 125). A first subtree data structure (e.g., subtrie 125A) that is connected to a second subtree data structure (e.g., subtrie 125C) as part of a particular branch of the tree data structure may include pointer information (e.g. pointer information 320) that identifies a location in the system memory where the second subtree data structure is stored. The pointer information may identify a memory size (e.g., memory size indication 325) of the second subtree data structure. In various embodiments, a memory size of the tree data structure does not permit the tree data structure to be loaded entirely into the system cache while a memory size of a given one of the plurality of subtree data structures permits the given subtree data structure to be loaded entirely into the system cache. In some cases, the tree data structure may not be stored as one continuous block of information in the system memory.

In step 620, the computer system performing, using the tree data structure, a key range lookup that includes traversing the particular branch. The performing may include loading the second subtree data structure into a system cache (e.g., system cache 144) using the pointer information included in the first subtree data structure. In some embodiments, the loading of the second subtree data structure into the system cache is based on the memory size (e.g., the computer system may issue a memory request for only the data from the system memory that encompasses the second subtree data structure). The pointer information may further identify a location in the system memory where a third subtree data structure (e.g., subtrie 125B) is stored. The first subtree data structure may be connected to the third subtree data structure as part of another particular branch of the tree data structure. In some embodiments, the computer system updates the tree data structure to include a set of nodes. The updating may result in the tree data structure including one or more additional subtree data structures.

Exemplary Computer System

Figure 7:
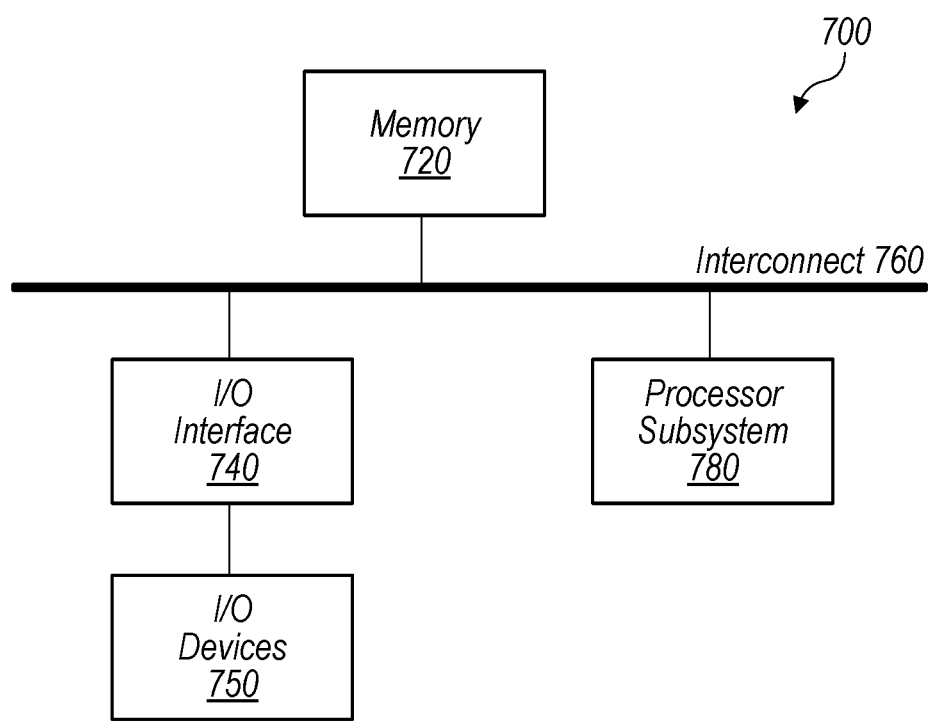
FIG. 7 is a block diagram illustrating an example computer system, according to some embodiments.

Turning now to FIG. 7, a block diagram of an exemplary computer system 700, which may implement system 100, database 110, and/or database node 130, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement database application 146 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   storing, by a computer system, a set of records in a file;
   storing, by the computer system, a multi-level tree data structure that is usable to determine whether a record for a database key is not stored in the file, wherein the multi-level tree data structure is stored in a system memory of the computer system as a plurality of subtree data structures, wherein a memory size of the multi-level tree data structure does not permit the multi-level tree data structure to be loaded entirely into a system cache of the computer system, and wherein a memory size of a given subtree data structure permits the given subtree data structure to be loaded entirely into the system cache, and wherein the given subtree data structure comprises a set of linked nodes that correspond to a set of characters of database keys inserted into the multi-level tree data structure;
as part of a key lookup for a particular database key, the computer system fetching, into the system cache from the system memory, a first subtree data structure encompassing a particular range of levels in the multi-level tree data structure, wherein the fetching is performed without accessing one or more other subtree data structures encompassing one or more levels within the particular range of levels, and wherein the first subtree data structure includes pointer information specifying a memory size of a second subtree data structure that enables the computer system to fetch the second subtree data structure entirely; and
fetching, by the computer system, the second subtree data structure into the system cache using the pointer information.

2. The method of claim 1, wherein a first character of the particular database key corresponds to a node in the first subtree data structure and a second character of the particular database key corresponds to a node in the second subtree data structure.

3. The method of claim 2, wherein the pointer information identifies a location in the system memory where a continuous block for the second subtree data structure is stored.

4. The method of claim 1, wherein the memory size indicates a number of cache lines that the second subtree data structure consumes when stored in the system cache.

5. The method of claim 1, further comprising:
updating, by the computer system, the multi-level tree data structure to include one or more nodes, wherein the updating includes modifying a particular one of the plurality of subtree data structures such that a particular range of levels encompassed by the particular subtree data structure is changed.

6. The method of claim 1, further comprising:
receiving a request to perform a transaction that includes writing, to a database, the file that includes the set of records; and
performing the transaction, including generating the multi-level tree data structure, wherein the multi-level tree data structure is associated with the file.

7. The method of claim 1, wherein the multi-level tree data structure is stored as a continuous block of information in the system memory.

8. A non-transitory computer readable medium having program instructions stored thereon that are capable of causing a computer system to perform operations comprising:
storing a set of records in a file;
storing a multi-level tree data structure that is usable to determine whether a record for a database key is not stored in the file, wherein the multi-level tree data structure is stored in a system memory of the computer system as a plurality of subtree data structures, wherein a memory size of the multi-level tree data structure does not permit the multi-level tree data structure to be loaded entirely into a system cache of the computer system, and wherein a memory size of a given subtree data structure permits the given subtree data structure to be loaded entirely into the system cache, and wherein the given subtree data structure comprises a set of linked nodes that correspond to a set of characters of database keys inserted into the multi-level tree data structure; and
as part of a key lookup for a particular database key, fetching, into the system cache from the system memory, for a first subtree data structure encompassing a particular range of levels in the multi-level tree data structure, wherein the fetching is performed without accessing one or more other subtree data structures encompassing one or more levels within the particular range of levels, and wherein the first subtree data structure includes pointer information specifying a memory size of a second subtree data structure that enables the computer system to fetch the second subtree data structure entirely; and
fetching the second subtree data structure into the system cache using the pointer information.

9. The non-transitory computer readable medium of claim 8, wherein the pointer information identifies a location in the system memory where a continuous block of the second subtree data structure is stored.

10. The non-transitory computer readable medium of claim 8, wherein the operations further comprise:
updating the multi-level tree data structure to include a set of nodes, wherein the updating includes expanding the set of linked nodes of one of the plurality of subtree data structures to include one or more of the set of nodes.

11. The non-transitory computer readable medium of claim 8, wherein the operations further comprise:
updating the multi-level tree data structure to include a set of nodes, wherein the updating includes splitting one of the plurality of subtree data structures into two or more subtree data structures.

12. A method, comprising:
storing, by a computer system in system memory, a tree data structure that is usable to determine whether a record for a database key is not stored in a file, wherein the tree data structure comprises a plurality of subtree data structures, wherein a first subtree data structure that is connected to a second subtree data structure as part of a particular branch of the tree data structure includes pointer information having data that specifies a memory size of the second subtree data structure and a location in the system memory where the second subtree data structure is stored, wherein a memory size of the tree data structure does not permit the tree data structure to be loaded entirely into a system cache of the computer system, and wherein a memory size of the first and second subtree data structures permits the first and second subtree data structures to be loaded entirely into the system cache; and
performing, by the computer system using the tree data structure, a key range lookup for a particular database key that includes traversing the particular branch, wherein the performing includes:
loading the first subtree data structure into the system cache; and
loading the second subtree data structure into the system cache using the pointer information included in the first subtree data structure.

13. The method of claim 12, wherein the pointer information further identifies a location in the system memory where a third subtree data structure is stored, and wherein the first subtree data structure is connected to the third subtree data structure as part of another particular branch of the tree data structure.

14. The method of claim 12, further comprising:
   updating the tree data structure to include a set of nodes, wherein the updating results in the tree data structure including one or more additional subtree data structures.

15. The method of claim 12, wherein the tree data structure is not stored as one continuous block of information in the system memory.

\* \* \* \* \*

UNITED STATES PATENT AND TRADEMARK OFFICE
CERTIFICATE OF CORRECTION

| | |
|---|---|
| PATENT NO. | : 11,681,705 B2 |
| APPLICATION NO. | : 16/918547 |
| DATED | : June 20, 2023 |
| INVENTOR(S) | : Patrick James Helland |

It is certified that error appears in the above-identified patent and that said Letters Patent is hereby corrected as shown below:

In the Claims

In Column 16 (Claim 8), Line 7, please delete "memory, for a first" and insert -- memory, a first --.

Signed and Sealed this
Eighteenth Day of July, 2023

Katherine Kelly Vidal
*Director of the United States Patent and Trademark Office*